(12) United States Patent
Kwag et al.

(10) Patent No.: US 8,354,179 B2
(45) Date of Patent: Jan. 15, 2013

(54) SECONDARY BATTERY

(75) Inventors: Nohyun Kwag, Yongin-si (KR); Kyungwon Seo, Yongin-si (KR); Youngcheol Jang, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 892 days.

(21) Appl. No.: 12/238,989

(22) Filed: Sep. 26, 2008

(65) Prior Publication Data

US 2009/0092891 A1 Apr. 9, 2009

(30) Foreign Application Priority Data

Oct. 4, 2007 (KR) ........................ 10-2007-0100039

(51) Int. Cl.
*H01M 14/00* (2006.01)
*H01M 2/00* (2006.01)
*H01M 2/10* (2006.01)
(52) U.S. Cl. ............................. 429/7; 429/163; 429/186
(58) Field of Classification Search .................... 429/96, 429/7, 186, 163
See application file for complete search history.

(56) References Cited

U.S. PATENT DOCUMENTS

| | | | |
|---|---|---|---|
| 7,879,481 B2 * | 2/2011 | Takeshita et al. | 429/99 |
| 2004/0191616 A1 * | 9/2004 | Hirota | 429/121 |
| 2006/0127756 A1 | 6/2006 | Seo | |
| 2007/0054180 A1 * | 3/2007 | Miyajima et al. | 429/96 |
| 2009/0305116 A1 * | 12/2009 | Yang et al. | 429/61 |

FOREIGN PATENT DOCUMENTS

| | | |
|---|---|---|
| CN | 1455464 | 11/2003 |
| CN | 2847547 | 12/2006 |
| EP | 1 411 579 | 4/2004 |
| JP | 07-320708 | 12/1995 |
| JP | 2006-310268 | 11/2006 |
| JP | 2007-035638 | 2/2007 |
| JP | 2007-188884 | 7/2007 |
| KR | 2006-34125 | 4/2006 |
| WO | WO 00/38254 | 6/2000 |

* cited by examiner

*Primary Examiner* — Patrick Ryan
*Assistant Examiner* — Lucas O Donnell
(74) *Attorney, Agent, or Firm* — Knobbe, Martens, Olson & Bear, LLP (57) ABSTRACT

A side case coupled to a secondary battery in a sliding manner to cover sides of the secondary battery. The secondary battery includes: a rectangular prism battery body; a guide member arranged in a lengthwise direction of one of the pair of the sides of the battery body; a first side case that includes a horizontal portion that is coupled to the guide member to cover one of the horizontal sides of the battery body and a vertical portion that is connected to one end of the horizontal portion to cover at least a portion of an adjacent side of the battery body; and a second side case that is coupled to the battery body, and includes vertical and horizontal portions that are generally symmetric to the vertical portion and the horizontal portion of the first side case and a plurality of terminal holes formed in the horizontal portion.

25 Claims, 11 Drawing Sheets

SECONDARY BATTERY

CROSS-REFERENCE TO RELATED APPLICATIONS

This application claims priority to and the benefit of Korean Patent Application No. 2007-100039, filed on Oct. 4, 2007, the content of which is incorporated herein by reference.

BACKGROUND OF THE INVENTION

1. Field of the Invention

Aspects of the present invention relate to a side case for a battery and a secondary battery using the same, and more particularly, to a side case that is coupled to a battery in a sliding manner and a secondary battery whose sides are covered with the side case.

2. Description of the Related Art

Unlike primary batteries, secondary batteries are rechargeable. secondary batteries have come into widespread use for small electronic apparatuses, such as cellular phones, personal digital assistants (PDAs), and notebook computers. In particular, lithium secondary batteries operate at a voltage of 3.6 V and are widely used as power supplies for electronic apparatuses. Lithium secondary batteries have operating voltages that are approximately 3 times higher than operating voltages of nickel-cadmium (Ni—Cd) batteries or nickel-metal hydride (Ni-MH) batteries, and lithium secondary batteries have high energy density per unit weight.

In general, the lithium secondary battery employs a lithium-based oxide as a positive electrode active material and a carbon material as a negative electrode active material. In addition, the lithium secondary battery may be formed in various shapes, such as a cylindrical shape, a square shape, and a pouch shape.

The square-shaped lithium secondary battery includes a jellyroll-type electrode assembly that is formed by spirally winding a laminated structure of a positive electrode plate, a separator, and a negative electrode plate, a can that has one side open and houses the electrode assembly, and a cap assembly that closes the opening portion of the can. Here, a combination of the electrode assembly, the can, and the can assembly is generally referred to as a bare cell, and the bare cell can be considered an independent secondary battery.

The secondary battery used for small electronic apparatuses is generally used in the form of a battery pack. The battery pack is formed by coupling the bare cell and a protective circuit module by molding and covering the coupled structure with a label or by putting the bare cell and the protective circuit module into an outer case, which is generally called a hard case.

Further, in recent years, an inner battery pack (which is generally and hereinafter referred to as an inner pack) that has a relatively simple structure and is compatible with various types of small electronic apparatuses has come into widespread use. However, since the inner pack according to the related art is manufactured by packing one bare cell, the inner pack has a relatively small amount of charge/discharge capacity, and thus does not have a sufficient amount of discharge for small and high-functionality electronic apparatuses. Therefore, the inner pack needs to be frequently charged due to rapid discharge, and the user should have several inner packs in case it is difficult to charge the inner pack.

In the inner pack according to the related art, the protective circuit board is coupled to the bare cell by molding using a molding resin. Therefore, in order to manufacture the inner pack, the following complicated process is performed: a core pack, which is a combination of the bare cell and the protective circuit board, is put into a mold; and a molding resin is injected into a molding space of the mold; the molding resin is hardened to couple the bare cell and the protective circuit board of the inner pack; and the inner pack is separated from the mold.

In such case, since it is difficult to recover the molding resin injected into the molding space of the mold, the process of injecting the molding resin should be accurately performed, which causes difficulty in manufacturing the inner pack. In addition, no matter how accurately the molding resin is injected, it is difficult to prevent non-uniform injection of the molding resin since the molding resin is in an amorphous state. As a result, the defect rate of the inner pack increases due to defects in the molding. Further, since the molding resin is viscous and is integrated with the core pack, it is difficult to repeat the process of forming the molding when defects occur in the molding.

SUMMARY OF THE INVENTION

Accordingly, aspects of the present invention provide a secondary battery in which a side case is coupled in a sliding manner to a single battery or a battery body including two or more unit batteries to cover a portion of the single battery or the battery body as well as the sides of the single battery or the battery structure. Further, a protective circuit board may be slidably disposed in the side case.

According to an aspect of the invention, a secondary battery includes: a battery body that includes a pair of horizontal sides that are parallel to each other, and a plurality of vertical sides having both ends thereof connected to the peripheries of the pair of horizontal sides; a guide member arranged in a lengthwise direction of any one of the pair of horizontal sides; a first side case that includes a horizontal portion that is coupled to the guide member of the battery body to cover any one of the horizontal sides of the battery body, and a vertical portion that is connected to one end of the horizontal portion to cover at least a portion of any one vertical side of the battery body; and a second side case that is coupled to the battery body and including vertical and horizontal portions that are symmetric to the vertical portion and the horizontal portion of the first side case and a plurality of terminal holes formed in the horizontal portion of the second side case.

According to aspects of the present invention, the guide member may include a guide rail, and the horizontal portions of the first and second side cases may have moving guide portions that are slidably coupled to the guide rail. According to aspects of the present invention, the guide rail may include a guide groove in the center of the guide rail in the lengthwise direction, and the moving guide portions may be guide protrusions that are fitted into the guide groove. According to aspects of the present invention, step portions may be respectively extended in the lengthwise direction from both ends of the guide rail of the guide member. According to aspects of the present invention, each of the horizontal portions of the first and second side cases may have a rectangular bottom and a plurality of sides extending from opposing sides of the rectangular bottom, and at least some of the plurality of sides may form the moving guide portion, and the plurality of sides may slide along the step portions of the guide rail.

According to aspects of the present invention, the secondary battery may further include a protective circuit board that is provided inside the horizontal portions of the first and second side cases and is electrically connected to the battery body.

According to aspects of the present invention, the guide member may be formed of a guide rail and coupled to one of the horizontal sides of the battery body, and the protective circuit board may be coupled to the guide member.

According to aspects of the present invention, the horizontal portions of the first and second side cases may cover one of the horizontal sides of the battery body, with the guide member of the battery body and the protective circuit board being accommodated therein.

According to aspects of the present invention, each of the horizontal portions of the first and second side cases may have a rectangular bottom and sides that extend in the lengthwise direction from opposing sides of the rectangular bottom. Ribs may be formed on the sides of each of the horizontal portions of the first and second side cases in the lengthwise direction, and the protective circuit board may be inserted between the ribs and the bottoms of the horizontal portions of the first and second side cases. Here, a distance between the ribs and the bottoms of the horizontal portions of the first and second side cases may be equal to the thickness of the protective circuit board.

According to aspects of the present invention, the protective circuit board may be electrically connected to the battery body by first and second lead plates, and the first and second lead plates electrically connect the protective circuit board to the battery body inside the horizontal portions of the first and second side cases.

According to aspects of the present invention, the battery body may be a single rectangular battery having a pair of horizontal sides parallel to each other and a pair of vertical sides parallel to each other.

According to aspects of the present invention, the battery body may be formed by connecting a plurality of rectangular unit batteries, each having a pair of horizontal sides parallel to each other and a pair of vertical sides parallel to each other, such that the horizontal sides are aligned to each other and the vertical sides are aligned with each other.

According to aspects of the present invention, the horizontal sides of each of the plurality of unit batteries may be curved, and a filling member may be provided at one end, opposite to the horizontal portions of the first and side cases, of each of the vertical portions of the first and second side cases to fill a gap between the curved horizontal sides of the plurality of unit batteries.

According to aspects of the present invention, the secondary battery may further include a coupling member that is provided in a contact portion between the horizontal portions of the first and second side cases to integrally couple the first and second side cases. According to aspects of the present invention, the coupling member may be a coupling protrusion and a coupling groove that are formed on the horizontal portions of the first and second side cases, respectively. According to aspects of the present invention, the outside diameter of the coupling protrusion may be equal to or larger than the inside diameter of the coupling groove.

According to aspects of the present invention, each of the vertical portions of the first and second side cases may have a rectangular bottom and sides disposed in the lengthwise direction from opposing sides of the rectangular bottom, and the vertical sides of the battery body that face the bottoms of the vertical portions may be inserted between the sides of the vertical portions of the first and second side cases.

According to aspects of the present invention, the secondary battery may further include an adhesive sheet that prevents the first and second side cases from sliding and fixes the first and second side cases to the battery body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures. In addition, elements referred to as being horizontal, or vertical, are described as such for convenience, and can have different orientations, depending on the orientation of the battery pack.

Figure 1:
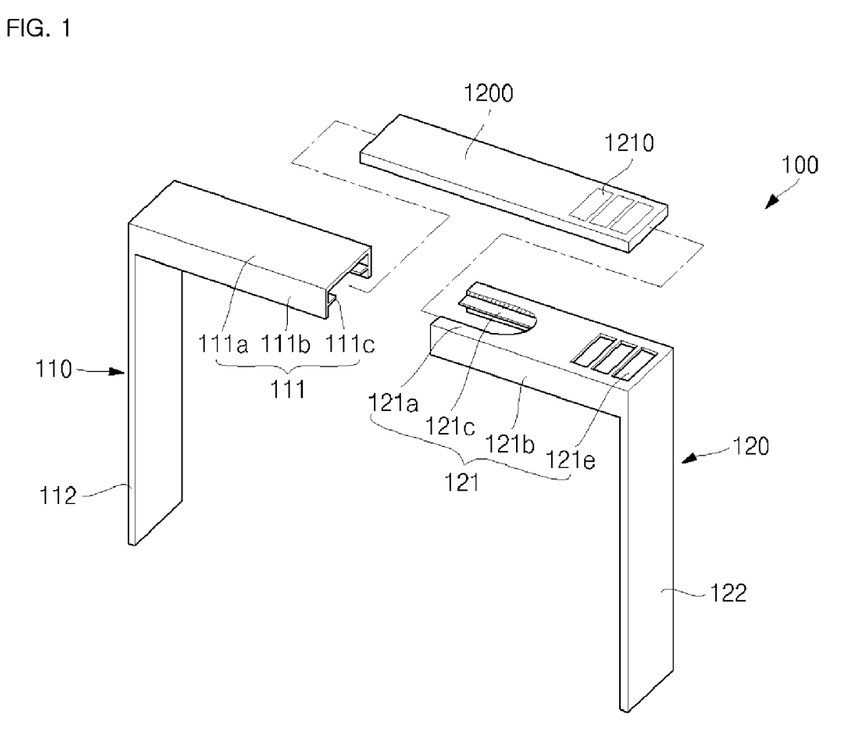
FIG. 1 is a perspective view illustrating a side case of a secondary battery according to an embodiment of the invention.
Figure 2:
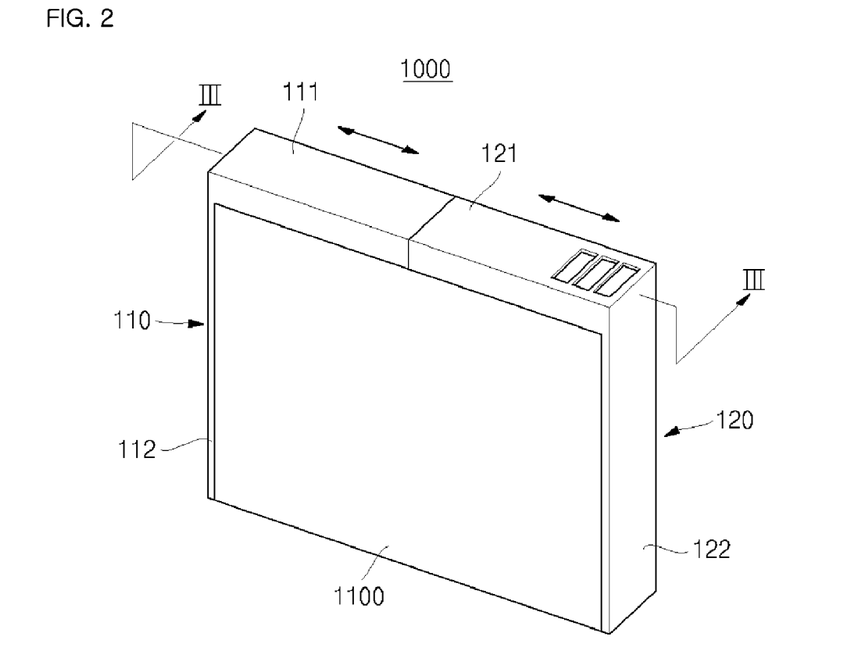
FIG. 2 is a perspective view illustrating a secondary battery having the side case shown in FIG. 1.
Figure 3:
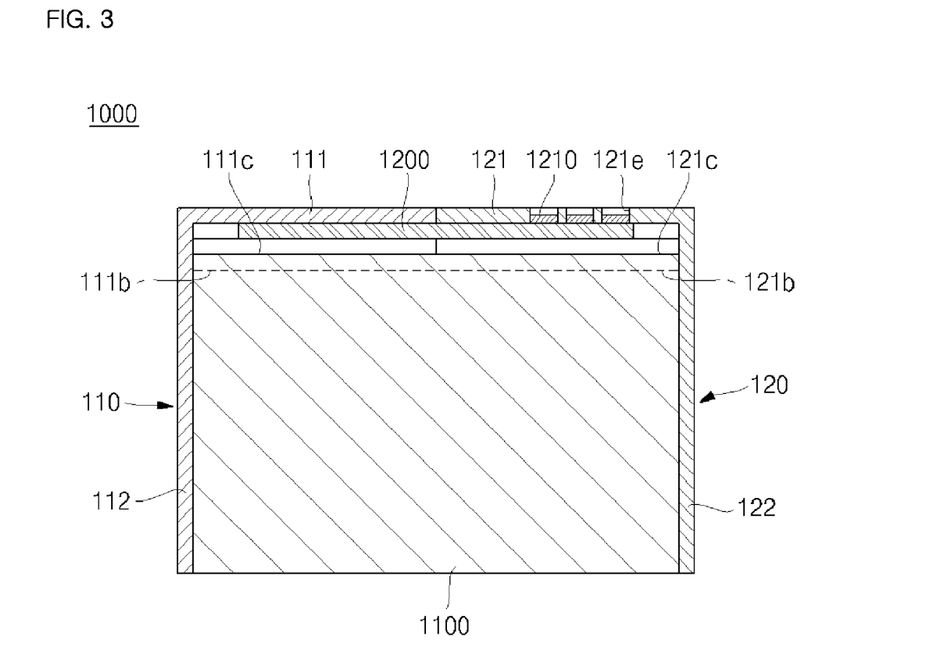
FIG. 3 is a cross-sectional view taken along the line III-III of FIG. 2.
Figure 4:
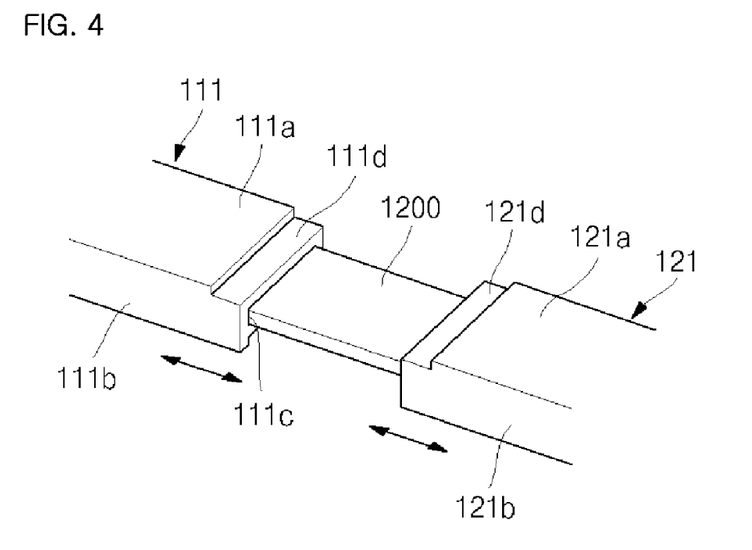
FIGS. 4 and 5 are perspective views illustrating a modification of the side case shown in FIG. 1.
Figure 5:
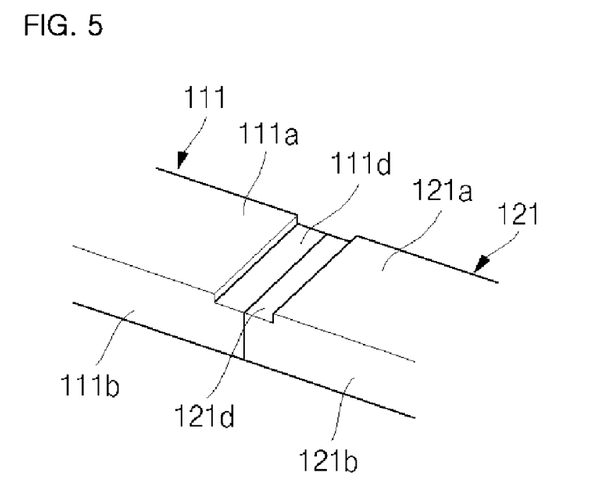

FIG. 1 is a perspective view illustrating a side case of a secondary battery according to an embodiment of the invention. FIG. 2 is a perspective view illustrating an example of a secondary battery having the side case shown in FIG. 1, and FIG. 3 is a cross-sectional view taken along the line III-III of FIG. 2. FIGS. 4 and 5 are perspective views illustrating a modification of the side case shown in FIG. 1.

As shown in FIGS. 1-3, a secondary battery 1000 according to an embodiment of the invention includes a battery body 1100, a side case 100 comprising first and second side cases 110 and 120, and a protective circuit board 1200. The second side case 120 is illustrated in FIG. 1 as a partial cutaway so as to better illustrate the ribs 111c and 121c, which are to be explained.

The first side case 110 includes a vertical portion 112 and a horizontal portion 111 connected to one end of the vertical portion 112. The horizontal portion 111 has a rectangular bottom 111a and sides 111b that extend from opposing sides of the rectangular bottom 111a. The horizontal portion 111 extends perpendicularly from the one end of the vertical portion 112. The sides 111b of the horizontal portion 111 extend at about right angles from the rectangular bottom 111a in the direction of the vertical portion 112. Further, the sides 111b extend from sides of the rectangular bottom 111a that are adjacent to a side of the rectangular bottom 111a that connects to the vertical portion 112. And, in this embodiment, the vertical portion 112 is a plate or planar, but the vertical portion 112 may be formed similarly to the horizontal portion 111 and include a rectangular bottom and sides that extend from opposing sides of the rectangular bottom adjacent to an end of the rectangular bottom connected to the horizontal portion 111.

The second side case 120 includes a vertical portion 122 and a horizontal portion 121 that are similar to the vertical portion 112 and the horizontal portion 111 of the first side case 110, respectively. That is, the horizontal portion 121 of the second side case 120 has a rectangular bottom 121a and sides 121b that from opposing sides of the rectangular bottom 121a. The horizontal portion 121 extends perpendicularly from the one of the vertical portion 122. The sides 121b of the horizontal portion 121 extend at about right angles from the rectangular bottom 121a in the direction of the vertical portion 122. Further, the sides 121b extend from sides of the rectangular bottom 121a that are adjacent to a side of the rectangular bottom 121a that connects to the vertical portion 122. In addition, the vertical portion 122 of the second side case 120 is a plate or planar, but the vertical portion 122 may be formed similarly to the horizontal portion 121 and include a rectangular bottom and sides that extend from opposing sides of the rectangular bottom adjacent to an end of the rectangular bottom connected to the horizontal portion 121. And, terminal holes 121e are formed in the rectangular bottom 121a of the horizontal portion 121 of the second side case 120 and allow external connection terminals 1210 of the protective circuit board 1200 that is provided inside the horizontal portion 121 of the second side case 120 to be exposed outside.

Ribs 111c and 121c are respectively formed on the sides 111b and 121b of the horizontal portions 111 and 121 of the first and second side cases 110 and 120 along the lengthwise direction of the sides 111b and 121b, respectively. The ribs 111c and 121c respectively formed on the sides 111b and 121b of the horizontal portions 111 and 121 of the first and second side cases 110 and 120 have a same height. Here, a distance between the ribs 111c and 121c and the rectangular bottoms 111a and 121a of the horizontal portions 111 and 121 of the first and second side cases 110 and 120 is equal to the thickness of the protective circuit board 1200 that is provided inside the horizontal portions 111 and 121 of the first and second side cases 110 and 120. In this way, the protective circuit board 1200 is inserted in a sliding manner between the ribs 111c and 121c and the rectangular bottoms 111a and 121a of the horizontal portions 111 and 121 of the first and second side cases 110 and 120. The protective circuit board 1200 may then coupled to the first and second side cases 110 and 120. The ribs 111c and 121c extend perpendicularly from facing surfaces of the sides 111b and 121b toward the opposing side 111b and 121b. Thus, one end of the protective circuit board 1200 is slidable into an area of the first side case 110 defined by the rectangular bottom 111a, the ribs 111c, and a portion of the sides 111b between the ribs 111c and the rectangular bottom 111a, and an other end of the protective circuit board 1200, the other end opposing the one end, is slidable into an area of the second side case 120 defined by the rectangular bottom 121a, the ribs 121c, and a portion of the sides 121b between the ribs 121c and the rectangular bottom 121a.

The battery body 1100 is configured to perform charge and discharge and is a rectangular prism having a pair of ends parallel to each other and a plurality of vertical sides connecting the periphery of one of the ends with the periphery of the other of the ends. Here, the ends of the battery body 1100 are rectangles.

The structure of the battery body 1100 to which the first and second side cases 110 and 120 are coupled will be described with reference to FIGS. 2 and 3. As represented by arrows in FIG. 2, the first and second side cases 110 and 120 are combined with or separated from each other at opposing sides of the battery body 1100. Here, the coupling between the first side case 110 and the battery body 1100 will be described. The horizontal portion 111 of the first side case 110 covers a portion of one of the pair of ends of the battery body 1100, and the vertical portion 112 covers one of the vertical sides of the battery body 1100. Here, the vertical portion 112 of the first side case 110 may cover only a portion of the vertical side of the battery body 1100. The horizontal portion 121 of the second side case 120 the remaining portion of the one of the pair of ends of the battery body 1100, i.e., the portion of the one of the pair of ends of the battery body 1100 not covered by the horizontal portion 111 of the first side case 110. The vertical portion 122 of the second side case 120 extends to cover one of the vertical sides of the battery body 1100, the one of the vertical sides of the battery body 1100 covered by the vertical portion 122 of the second side case being opposite the one of the vertical sides covered by the vertical portion 112 of the first side case. Here, the vertical portion 122 of the second side case 120 may cover only a portion of the vertical side of the battery body 1100.

The protective circuit board 1200 is electrically connected to the battery body 1100, and the electrical connections may be one of various electrical connections. In this embodiment, a detailed description and illustration of the electrical connection between the battery body 1100 and the protective circuit board 1200 will be omitted.

FIGS. 4 and 5 are perspective views illustrating a modification of the side case 100 of the secondary battery 1000 shown in FIGS. 1 to 3. As shown in FIGS. 4 and 5, step portions 111d and 121d are formed in a contact portion between the horizontal portions 111 and 121 of the first and second side cases 110 and 120, i.e., the step portions 111d and 121d are formed at one end of each of the rectangular bottoms 111c and 121c, the one end being opposite the end of the rectangular bottoms 111c and 121c connected to the vertical portions 112 and 122. An adhesive sheet (not shown) may be adhered to the step portions 111d and 121d. That is, the adhesive sheet is adhered to a portion in which the horizontal portions 111 and 121 of the first and second side cases 110 and 120 are coupled so as be laid across the horizontal portions 111 and 112 of the first and second side cases 110 and 120. The adhesive sheet prevents the first and second side cases 110 and 120 from sliding in the direction in which the first and second side cases 110 and 120 are separated from the battery body 1100, i.e., from separating.

The adhesive sheet has a thickness and may protrude from the surface of a connection portion between the horizontal portions 111 and 121 of the first and second side cases 110 and 120. Therefore, the step portions 111d and 121d offset the thickness of the adhesive sheet and are formed in the first and second side cases 110 and 120, respectively, to prevent the adhesive sheet from protruding from the surface of the connection portion between the horizontal portions 111 and 121 of the first and second side cases 110 and 120, i.e., the step portions 111d and 121d may be as deep as the adhesive sheet is thick. And, the adhesive sheet may be a label of the secondary battery 1000.

Figure 6:
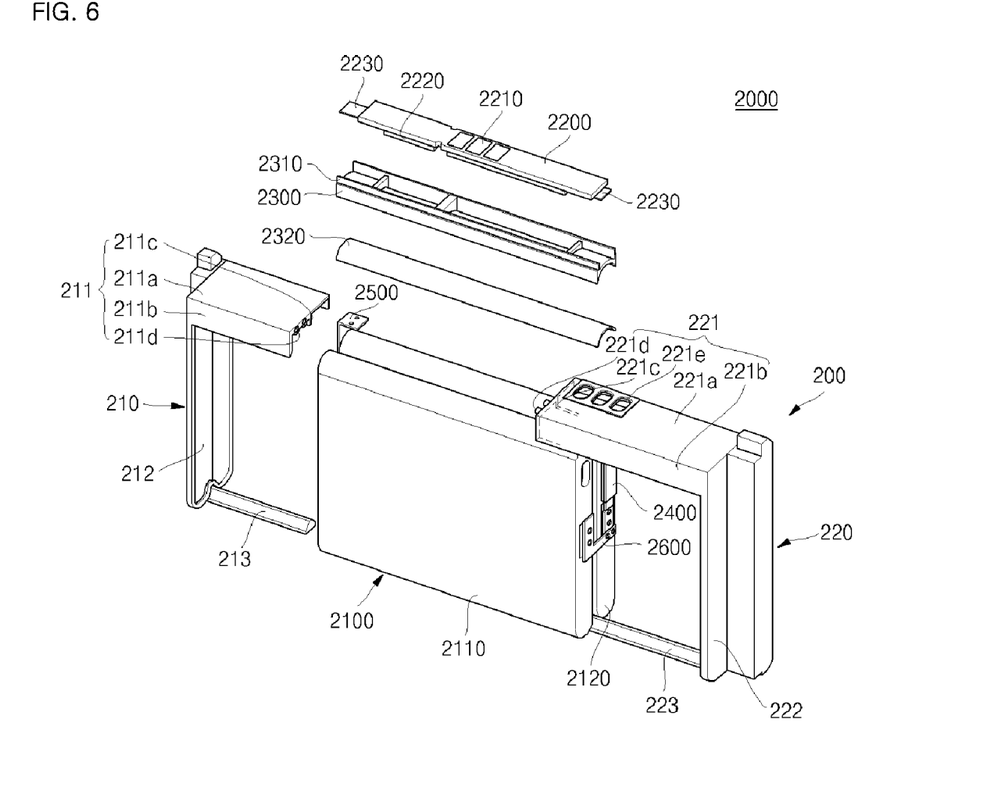
FIG. 6 is an exploded perspective view illustrating a secondary battery according to another embodiment of the invention.
Figure 7:
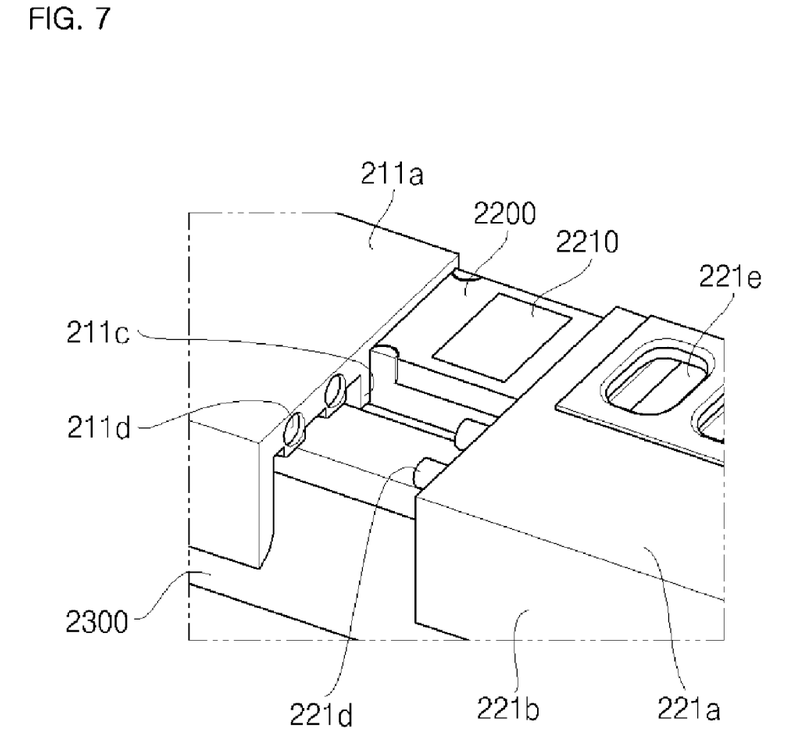
FIG. 7 is a magnified view illustrating a main part of the secondary battery shown in FIG. 6.
Figure 8:
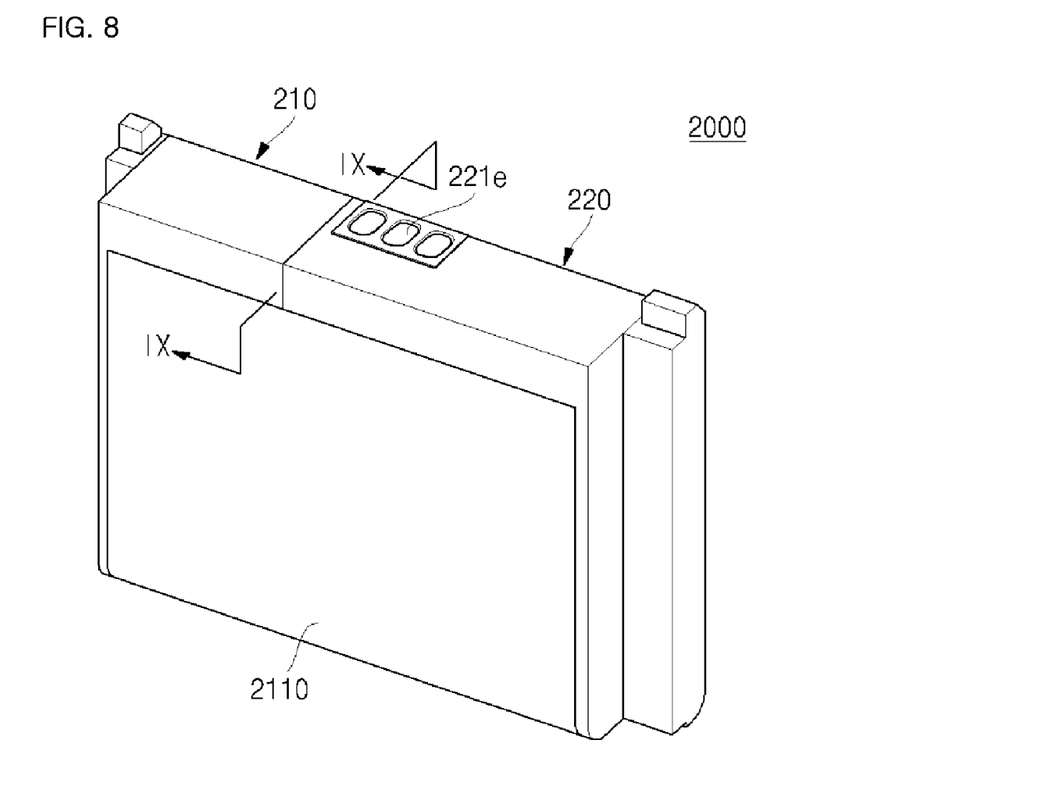
FIG. 8 is an assembled perspective view illustrating the secondary battery shown in FIG. 6.
Figure 9:
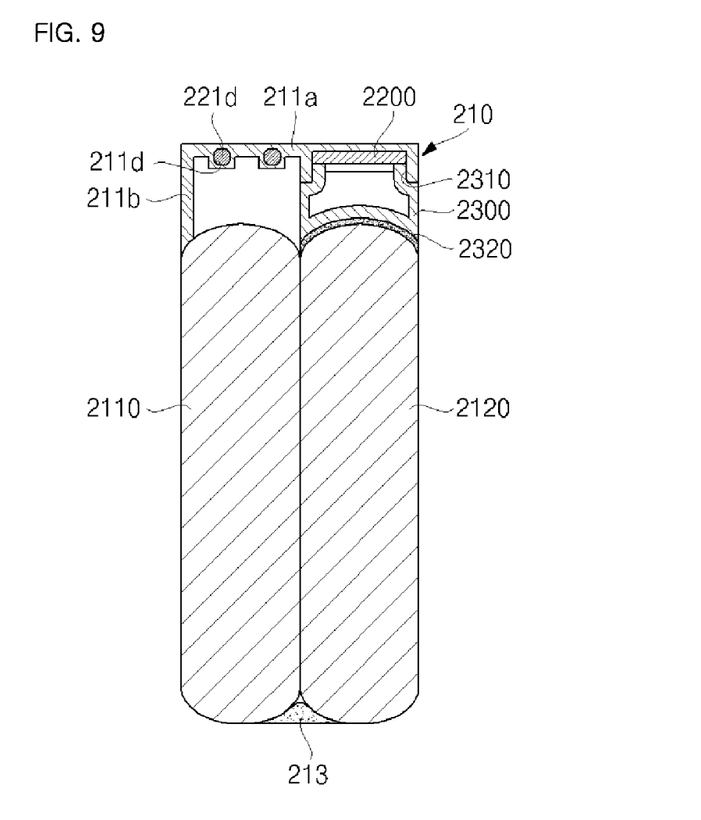
FIG. 9 is a cross-sectional view taken along the line IX-IX of FIG. 8.
Figure 10:
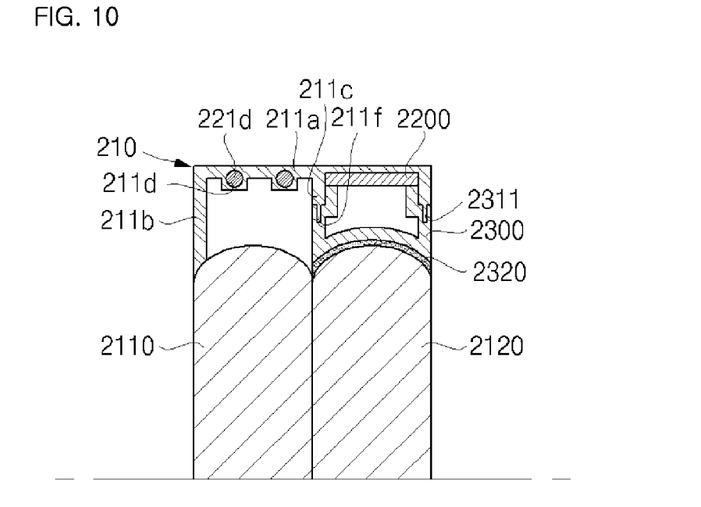
FIG. 10 is a cross-sectional view illustrating a modification of the secondary battery shown in FIG. 6.

FIG. 6 is an exploded perspective view illustrating a secondary battery according to another embodiment of the invention. FIG. 7 is a magnified perspective view illustrating a main part of the secondary battery shown in FIG. 6. FIG. 8 is an assembled perspective view illustrating the secondary battery shown in FIG. 6, and FIG. 9 is a cross-sectional view of the secondary battery taken along the line IX-IX of FIG. 8. FIG. 10 is a cross-sectional view illustrating a modification of the secondary battery shown in FIG. 6, and FIG. 11 is a perspective view illustrating the secondary battery shown in FIG. 6 that is covered with a label.

Figure 11:
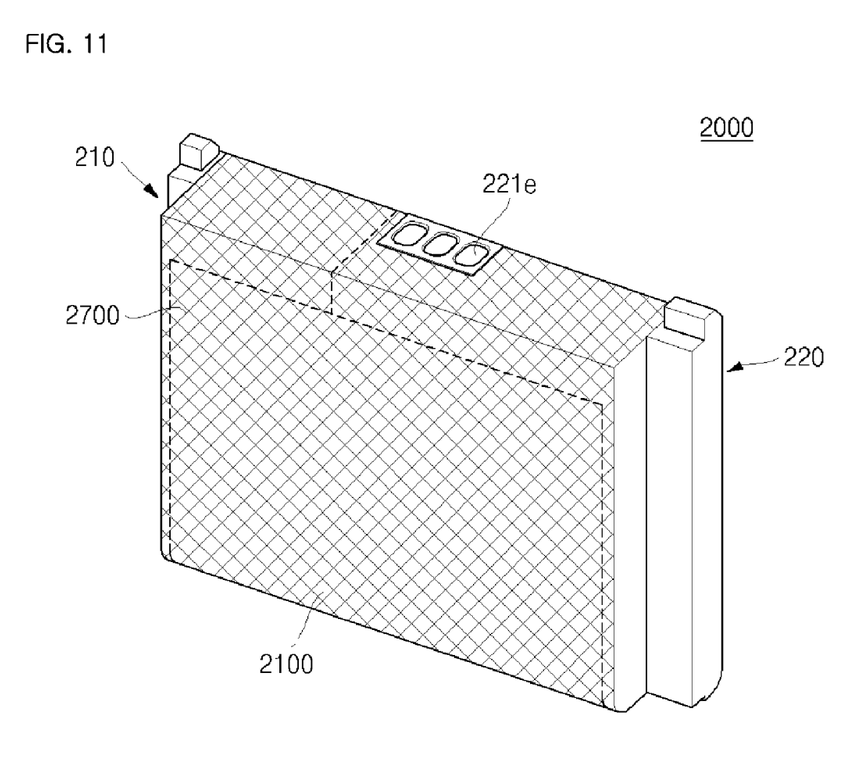
FIG. 11 is a perspective view illustrating the secondary battery shown in FIG. 6 that is covered with a label.

As shown in the drawings, a secondary battery 2000 according to this embodiment includes a battery body 2100, a side case 200 comprising first and second side cases 210 and 220, a guide member 2300, a protective circuit board 2200, and an adhesive sheet 2700 (FIG. 11).

The battery body 2100 comprises a pair of rectangular unit batteries 2110 and 2120. That is, the battery body 2100 is formed by connecting a pair of rectangular unit batteries 2110 and 2120. The rectangular unit batteries 2110 and 2120 are aligned to form a rectangular battery body 2100. The rectangular unit batteries 2110 and 2120 are shown as being physically connected at a side of largest surface area.

Further, the unit batteries 2110 and 2120 are electrically connected to each other. Each of the pair of unit batteries 2110 and 2120 has a positive or negative electrode terminal on one of the pair of vertical sides. Such electrode terminals are electrically connected to each other by a connection terminal 2600. The unit batteries 2110 and 2120 may be electrically connected in series or parallel.

The guide member 2300 is provided on one of sides of the battery body 2100. Horizontal portions 211 and 221 of the first and second side cases 210 and 220 are respectively coupled to the guide member 2300. The guide member 2300 has a guide rail shape; therefore, the horizontal portions 211 and 221 of the first and second side cases 210 and 220 are each slidably coupled to the guide member 2300.

Here, the guide member 2300 has guide portions 2310 that extend from opposing sides thereof. Moving guide portions that slide along the guide portions 2310 of the guide member 2300 are formed in the horizontal portions 211 and 221 of the first and second side cases 210 and 220. In this embodiment, some of a plurality of sides 211b, 211c, 211g, 221b, 221c, and 221g, which extend from the horizontal portions 211 and 221, serve as the moving guide portions. Therefore, the sides 211c, 211g, 221c, and 221g of the horizontal portions 211 and 221 slide on the guide portions 2310 of the guide member 2300.

And, the guide member 2300 may be coupled to the battery body 2100 with a double-sided tape 2320 disposed therebetween, and the double-sided tape 2320 may be formed of an insulating material. The guide member 2300 may be a resin mold that is formed by injection molding.

In addition, the first and second side cases 210 and 220 have filling members 213 and 223, respectively. The filling members 213 and 223 fill up a gap in the side of the battery body 2100 that is opposite to the side covered with the first and second side cases 210 and 220. In other words, in the battery body 2100 having a pair of unit batteries 2110 and 2120 arranged in adjacent to each other, when a pair of horizontal sides, which are parallel to each other, of each of the unit batteries 2110 and 2120 are curved, a gap is formed in a connection portion between the horizontal sides of the unit batteries 2110 and 2120. Therefore, the filling members 213 and 223 respectively provided in the first and second side cases 210 and 220 to fill the gap formed in the horizontal side of the battery body 2100. The filling members 213 and 223 may be formed of a sufficient size and of a sufficient height to fill the gap formed between the pair of the unit batteries 2110 and 2120.

Although not shown in the drawings, as in the embodiment shown in FIGS. 1 to 3, ribs may be formed on the sides 211c, 211g, 221c, and 221g of the horizontal portion 211 and 221 of the first and second side cases 210 and 220, and a protective circuit board 2200 may be slidably provided between the bottoms 211a and 221a and the ribs. In this state, the guide member 2300 is coupled to the protective circuit board 2200. And, in this way, the protective circuit board 2200 is covered with the horizontal portions 211 and 221 of the first and second side cases 210 and 220, and terminal holes 221e are formed in the horizontal portion 221 of the second side case 220, so that external connection terminals 2210 of the protective circuit board 2200 are exposed outside. However, aspects of the present invention are not limited thereto such that the protective circuit board 2200 may be supported between the sides 211c, 211g, 221c, and 221g of the horizontal portion 211 and 221 of the first and second side cases 210 and 220 by the guide portions 2310 of the guide member 2300.

More specifically, the protective circuit board 2200 is formed by mounting various electronic devices 2220 on a printed circuit board (PCB), and is electrically connected to the battery body 2100. And, the protective circuit board 2200 may be integrated with the guide member 2300 by performing insert injection molding on the guide member 2300. Further, the protective circuit board 2200 is provided with internal connection terminals 2230 electrically connected to the battery body 2100 and the external connection terminals 2210 to electrically connect the battery body 2100 to external electronic apparatuses.

The secondary battery may further include a coupling member that is provided in a contact portion between the first and second side cases 210 and 220 to couple portions of the first and second side cases 210 and 220.

Such coupling member prevents the first and second side cases 210 and 220 coupled to the battery body 2100 from sliding in a direction in which the first and second side cases 210 and 220 are separated from the battery body 2100, i.e., the coupling member may prevent the first and second side cases 210 and 220 from separating. The coupling member may be composed of a coupling groove 211d and a coupling protrusion 221d formed on the first and second side cases 210 and 220, respectively. Here, the coupling protrusion 221d and the coupling groove 211d are formed such that the outside diameter of the coupling protrusion 221d is equal to or larger than the inside diameter of the coupling groove 211d. In this way, the coupling protrusion 221d is fit into the coupling groove 211d such that the outer surface of the coupling protrusion 221d tightly contacts with the inner surface of the coupling groove 211d. As a result, the coupling protrusion 221d is fit into and fixed to the coupling groove 211d with a strong friction force being applied between the outer surface of the coupling protrusion 221d and the inner surface of the coupling groove 211d.

And, the electrical connection between the protective circuit board 2200 and the battery body 2100 may be made by first and second lead plates 2400 and 2500. The first and second lead plates 2400 and 2500 are provided inside the first and second side cases 210 and 220, respectively, to electrically connect positive and negative electrodes of the battery body 2100 and the protective circuit board 2200.

In addition, an adhesive sheet 2700 may be adhered to both the first and second side cases 210 and 220 in order to prevent the first and second side cases 210 and 220 coupled to the battery body 2100 from sliding in the direction in which the first and second side cases 210 and 220 are separated from the battery body 2100. And, as shown in FIG. 11, the adhesive sheet 2700 may cover the entire surface of the secondary battery 2000 and may be, for example, a label.

FIG. 10 is a diagram illustrating another example of the guide member 2300 and the moving guide portions of the first and second side cases 210 and 220 that are slidably coupled to the guide member 2300. As shown in FIG. 10, a guide groove 2311 is formed in the center of the guide member 2300 along the lengthwise direction, and the moving guide portions respectively formed on the horizontal portions 211 and 221 of the first and second side cases 210 and 220 are guide protrusions 211f and 221f and the moving guide portions which are guide protrusions 211f and 221f are inserted into the guide groove 2311 of the guide member 2300 and slide along the guide groove 2311.

Figure 12:
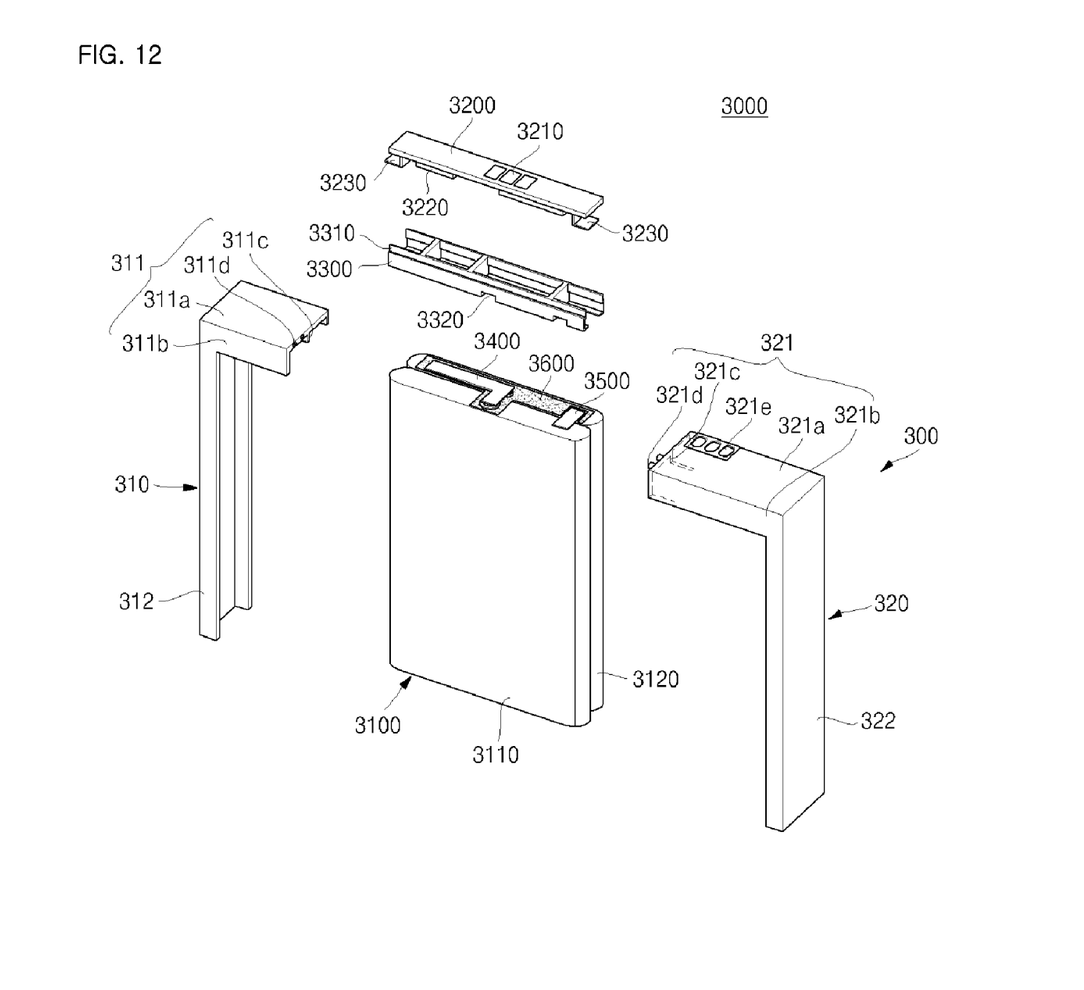
FIG. 12 is an exploded perspective view illustrating a secondary battery according to still another embodiment of the invention.
Figure 13:
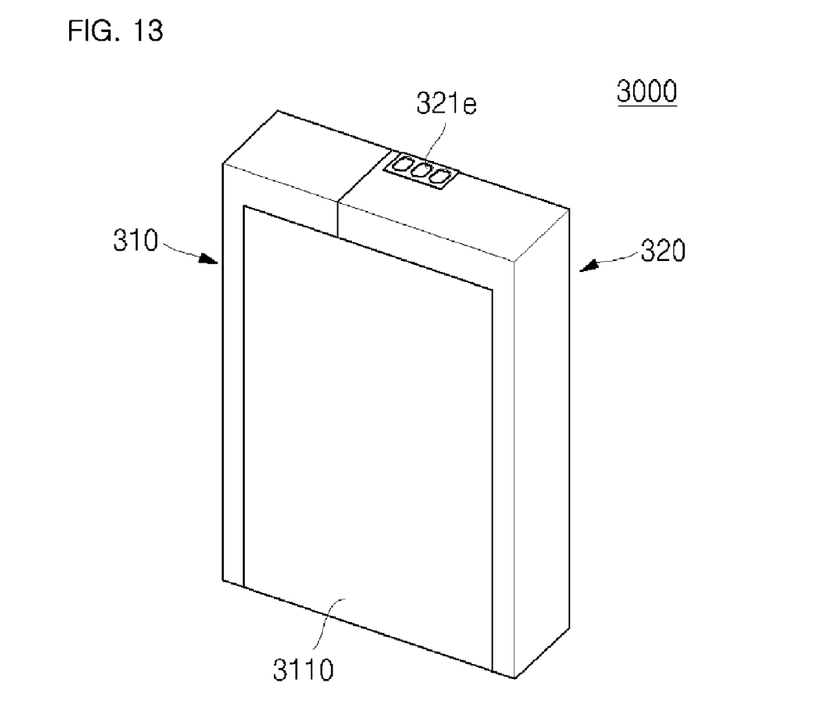
FIG. 13 is an assembled perspective view illustrating the secondary battery shown in FIG. 12.
Figure 14:
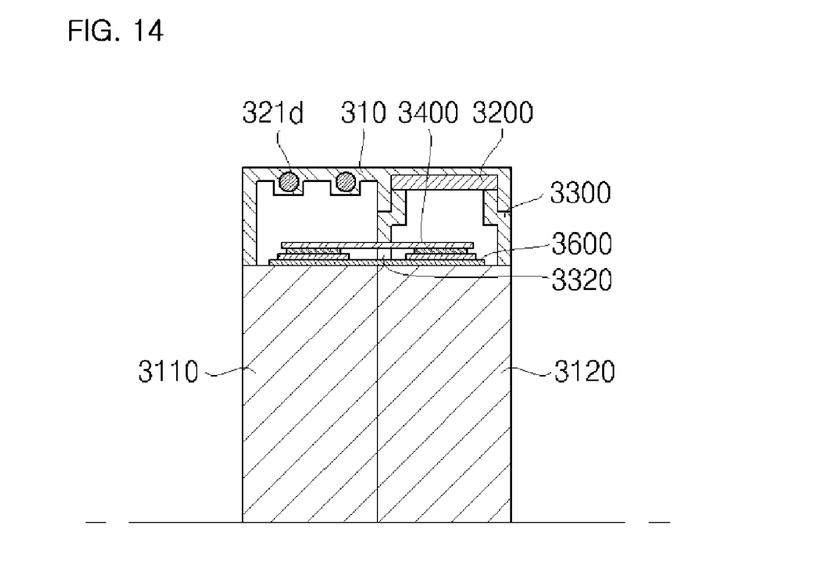
FIG. 14 is a cross-sectional view taken along the line XIV-XIV of FIG. 13.

FIGS. 12 to 14 are diagrams illustrating a secondary battery according to still another embodiment of the invention. As shown in FIGS. 12 to 14, a secondary battery 3000 according to this embodiment is similar to the secondary battery 2000 shown in FIGS. 6 to 11 in that the secondary battery 3000 includes a battery body 3100, a guide member 3300, a side case 300 comprising first and second side cases 310 and 320, and a protective circuit board 3200. However, the secondary battery 3000 differs from the secondary battery 2000 in that one side of the plurality of sides of each of the rectangular unit batteries 3110 and 3120 forming the battery body 3100 includes terminals. The rectangular unit batteries 3110 and 3120 may be aligned so that the side having the terminals of each of the rectangular unit batteries 3110 and 3120 are adjacent or on the same side of the battery body 3100. Further, the guide member 3300 and the protective circuit board 3200 may be provided on the side of the battery body 3100 on which the terminals of the rectangular unit batteries 3110 and 3120 are located.

Therefore, the structure of the secondary battery 3000 according to this embodiment is similar to that of the secondary battery shown in FIGS. 6 to 11, and thus the structure of the secondary battery 3000 according to this embodiment will be briefly described below.

Referring to FIG. 12, the battery body 3100 includes a pair of unit batteries 3110 and 3120 physically arranged in parallel to each other, and here, a pair of unit battery 3110 and 3120 is formed by connecting a pair of horizontal sides parallel each other and a pair of vertical sides parallel each other, respectively. Here, the horizontal sides of the unit batteries 3110 and 3120 are relatively shorter than the vertical sides.

In addition, each of the pair of unit batteries 3110 and 3120 has a positive or negative electrode terminal on one of the pair of horizontal sides. The electrode terminals of the pair of unit batteries 3110 and 3120 are electrically connected to each other by a first connection terminal 3400. In this case, the first connection terminal 3400 is insulated from the surfaces of the pair of unit batteries 3110 and 3120 by an insulating sheet 3600. In addition, outer cases of the pair of unit batteries 3110 and 3120 having a positive or negative polarity are electrically connected to each other by a second connection terminal 3500. The electrode terminals of the pair of unit batteries 3110 and 3120 are insulated from the outer cases of the unit batteries 3110 and 3120 by an insulating gasket (not shown). Further, the pair of unit batteries 3110 and 3120 may be electrically connected in series or parallel.

And, the guide member 3300 is coupled to one of the pair of horizontal sides, which are parallel to each other, of the battery body 3100 that has the electrode terminals provided thereon. Step portions 3310 are formed along the lengthwise direction at on opposing sides of the guide member 3300, and sides 311c, 311g, 321c, and 321g of horizontal portions 311 and 321 of the first and second side cases 310 and 320 slide on the step portions 3310.

Further, the protective circuit board 3200 is coupled to the guide member 3300, and the protective circuit board 3200 is provided with a protective circuit for the battery body 3100. And, the protective circuit board 3200 includes internal connection terminals 3230 that are electrically connected to the first and second connection terminals 3400 and 3500 of the battery body 3100 and external connection terminals 3210 that are electrically connected to external apparatuses.

In addition, the first and second side cases 310 and 320 cover a pair of vertical sides parallel to each other and one of the horizontal sides of the battery body 3100. Here, the horizontal portion 311 of the first side case 310 includes a rectangular bottom 311a and the sides 311b, 311c, and 311g that extend from opposing sides of the bottom 311a, the opposing sides being adjacent to a side of the horizontal portion 311 connected to the vertical portion 310. And, the horizontal portion 321 of the second side case 320 includes a rectangular bottom 321a and the sides 321b, 321c, and 321g that extend from opposing sides of the rectangular bottom 321a, the opposing sides being adjacent to a side of the horizontal portion 321 connected to the vertical portion 320. And, the vertical portion 312 of the first side case 310 includes a rectangular bottom 312a and sides 312b that extend from opposing sides of the rectangular bottom 312a, the opposing sides being adjacent to a side of the vertical portion 312 connected to the horizontal portion 311. And the vertical portion 322 of the second side case 320 includes a rectangular bottom 322a and sides 322b that extend from opposing sides of the rectangular bottom 322a, the opposing sides being adjacent to a side of the vertical portion 322 connected to the horizontal portion 321. A pair of vertical sides, which are parallel to each other, of the battery body 3100 are inserted between the sides 312b and 322b of the vertical portions 312 and 322 of the first and second side cases 310 and 320, respectively, so that the first and second side cases 310 and 320 are coupled to the battery body 3100.

And, the protective circuit board 3200 is provided inside the horizontal portions 311 and 321 of the first and second side cases 310 and 320, and accordingly, terminal holes 321e are formed in the second side case 320, so that the external connection terminals 3210 of the protective circuit board 3200 are exposed outside.

In addition, the secondary battery further includes a coupling member that is provided in a contact portion between the first and second side cases 310 and 320 and couples portions of the first and second side cases 310 and 320. Such coupling member includes a coupling groove 311d and a coupling protrusion 321d.

Cut portions 3320 prevent interference between the bottom of the guide member 3300 and the first and second connection terminals 3400 and 3500 occurring when the guide member 3300 is coupled to the battery body 3100.

Figure 15:
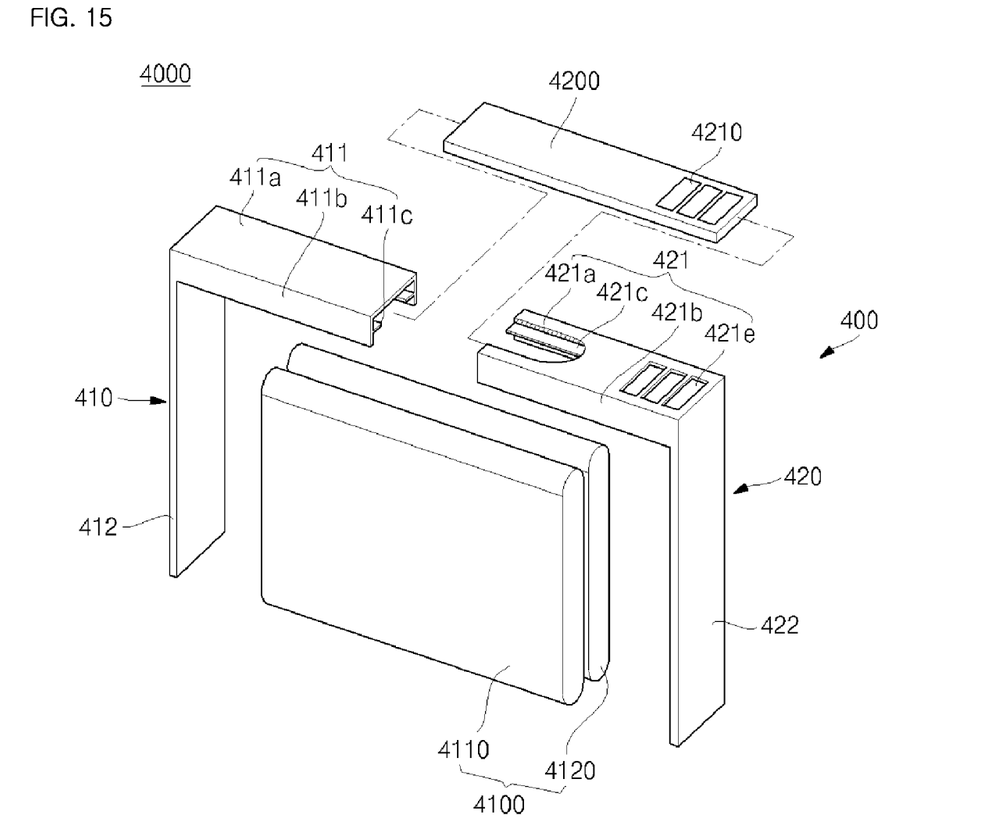
FIG. 15 is an exploded perspective view illustrating a secondary battery according to yet another embodiment of the invention.

FIG. 15 is a diagram illustrating a secondary battery according to yet still another embodiment of the invention. As shown in FIG. 15, a secondary battery 4000 includes a battery body 4100, a side case 400 comprising first and second side cases 410 and 420, and a protective circuit board 4200. The second side case 420 is illustrated in FIG. 15 as a partial cutaway so as to better illustrate the ribs 411c and 421c, which are to be explained.

The basic structure of the secondary battery according to this embodiment is similar to that of the secondary battery shown in FIGS. 2 and 3 except that the battery body 4100 includes a pair of rectangular unit batteries 4110 and 4120 that are physically arranged in parallel to each other as in the embodiment shown in FIGS. 6 and 8 and the widths of horizontal portions 411 and 421 and vertical portions 412 and 422 of the first and second side cases 410 and 420 increase or decrease corresponding to the size of the battery body 4100 composed of the pair of unit batteries 4110 and 4120. That is, the battery body 4100 has a rectangular structure including a pair of horizontal sides parallel to each other and opposing vertical sides parallel to each other. The battery body 4100 is formed by connecting the rectangular unit batteries 4110 and 4120, each having a pair of horizontal sides parallel to each other and a pair of vertical sides parallel to each other, such that the horizontal sides are aligned with each other and the vertical sides are aligned with each other. The battery body 4100 may include more unit batteries therein and such unit batteries may be electrically connected in series or parallel, or combinations thereof.

The first side case 410 includes a vertical portion 412 and a horizontal portion 411 connected to one end of the vertical portion 412. The horizontal portion 411 includes a rectangular bottom 411a and sides 411b that extend from opposing sides of the rectangular bottom 411a, the opposing sides being adjacent to the side of the horizontal portion 411 connected to the vertical portion 412. The vertical portion 412 is formed in a plate or planar shape. The second side case 420 includes a vertical portion 422 and a horizontal portion 421 that are symmetric to the vertical portion 412 and the horizontal portion 411 of the first side case 410, respectively. That is, the horizontal portion 421 of the second side case 420 has a rectangular bottom 421a and sides 421b that extend from opposing sides of the rectangular bottom 421a, the opposing sides being adjacent to the side of the horizontal portion 421 connected to the vertical portion 422. And, the vertical portion 422 of the second side case 420 is formed in a plate or planar shape. In addition, terminal holes 421e are formed in the rectangular bottom 421a of the horizontal portion 421 of the second side case 420.

And, ribs 411c and 421c are respectively formed on the sides 411b and 421b of the horizontal portions 411 and 421 of the first and second side cases 410 and 420 along the lengthwise direction. Such ribs 411c and 421c respectively formed on the sides 411b and 421b of the horizontal portions 411 and 421 of the first and second side cases 410 and 420 have a same height. Here, the distance between the ribs 411c and 421c and the rectangular bottoms 411a and 421a of the horizontal portions 411 and 421 of the first and second side cases 410 and 420 is equal to the thickness of the protective circuit board 4200 that is provided inside the horizontal portions 411 and 421 of the first and second side cases 410 and 420. In this way, the protective circuit board 4200 is inserted in a sliding manner between the ribs 411c and 421c and the rectangular bottoms 411a and 421a of the horizontal portions 411 and 421 of the first and second side cases 410 and 420. The protective circuit board 4200 may be coupled to the first and second side cases 410 and 420. The ribs 111c and 121c extend perpendicularly from facing surfaces of the sides 111b and 121b toward the opposing side 111b and 121b. Thus, one end of the protective circuit board 1200 is slidable into an area of the first side case 110 defined by the rectangular bottom 111a, the ribs 111c, and a portion of the sides 111b between the ribs 111c and the rectangular bottom 111a, and an other end of the protective circuit board 1200, the other end opposing the one end, is slidable into an area of the second side case 120 defined by the rectangular bottom 121a, the ribs 121c, and a portion of the sides 121b between the ribs 121c and the rectangular bottom 121a.

According to the above-mentioned structure, in the battery body 4100, a pair of vertical sides parallel to each other and one of the horizontal sides are parallel to each other are covered with the first and second side cases 410 and 420 when the first and second side cases 410 and 420 are coupled to the battery body 4100. At that time, the protective circuit board 4200 is provided on any one horizontal side of the battery body 4100 that is covered with the first and second side cases 410 and 420, so that the protective circuit board 4200 is also covered with the first and second side cases 410 and 420.

According to the side case and the secondary battery according to the embodiments shown in FIGS. 1 to 15, the side case may be coupled to a battery body that comprises a single battery or two or more unit batteries. Therefore, it is possible to manufacture a secondary battery having a relatively large amount of capacity through only a process of assembling components that have been manufactured beforehand. In addition, when there are some defects in a manufactured battery pack of a secondary battery or when any trouble occurs during the use of the battery pack, it is possible to easily perform processes of disassembling, repairing, and reassembling the battery pack.

As described above, according to the secondary batteries of the above-described embodiments, it is possible to easily couple the side case and the protective circuit board to one or more unit batteries. In addition, it is possible to easily manufacture and provide a battery pack having a sufficient amount of discharge capacity that can be applied to small electronic apparatuses requiring a large amount of discharge capacity due to high functionality. Further, it is possible to easily separate the side case or the protective circuit board from a manufactured battery pack, or easily recombine the side case or the protective circuit board with the manufactured battery pack.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   a battery body having a pair of horizontal sides parallel to each other, a plurality of vertical sides to connect peripheries of the pair of horizontal sides; and
   a side case, comprising:
      a first side case having a horizontal portion disposed to cover a first area of one of the horizontal sides of the battery body and a vertical portion that is connected to one end of the horizontal portion to cover at least a portion of any one vertical side of the battery body adjacent to the one of the horizontal sides of the battery body,
      a second side case having a horizontal portion, in which a plurality of terminal holes is formed, disposed to cover a second area of the one of the horizontal sides of the battery body and a vertical portion that is connected to one end of the horizontal portion to cover at least a portion of a vertical side of the battery body opposite to the any one vertical side of the battery body covered by the vertical portion of the first side case; and a guide member disposed between the battery body and the horizontal portions of the first and second side cases of the side case, and a protective circuit board disposed between the guide member and the horizontal portions of the first and second side cases and electrically connected to the battery body;

wherein the guide member comprises guide rails and the horizontal portions of the first and second side cases have moving guide portions to couple slidably the guide member to the first and second side cases.

2. The secondary battery of claim 1, wherein
the guide rails each comprise a guide groove formed in the center of each of the guide rails and formed in a lengthwise direction of the guide members, and
the moving guide portions each comprise guide protrusions that fit into corresponding guide grooves.

3. The secondary battery of claim 1, wherein
the guide members each comprise step portions formed in the lengthwise direction of the guide rail of the guide member,
each of the first portions of the first and second side cases comprises a rectangular bottom and a plurality of sides extending in the lengthwise direction of the rectangular bottom and extending away from the rectangular bottom, and
at least some of the plurality of sides form the moving guide portion, and slide on the step portions of the guide rail.

4. The secondary battery of claim 1, wherein
the guide member of the battery body comprises a guide rail, and the guide member is coupled to one of the horizontal sides of the battery body, and
the protective circuit board is coupled to the guide member.

5. The secondary battery of claim 4, wherein
the horizontal portions of the first and second side cases completely cover one of the horizontal sides of the battery body, the guide member being disposed between the horizontal portions of the first and second side cases and the protective circuit board being disposed between the guide member and the horizontal portions of the first and second side cases.

6. The secondary battery of claim 1, wherein
each of the horizontal portions of the first and second side cases comprises:
 a rectangular bottom;
 sides that extend in a lengthwise direction of the rectangular bottom and from opposing sides of the rectangular bottom; and
 ribs formed on the sides of each of the horizontal portions of the first and second side cases extending in a lengthwise direction of the sides and extending from a side toward the opposing side of the first and second side cases,
wherein the protective circuit board is disposed between the ribs and the rectangular bottoms of the horizontal portions of the first and second side cases.

7. The secondary battery of claim 6, wherein
a distance between the ribs and the rectangular bottoms of the horizontal portions of the first and second side cases is equal to the thickness of the protective circuit board.

8. The secondary battery of claim 1, further comprising
first and second lead plates to electrically connect the protective circuit board to the battery body.

9. The secondary battery of claim 1, wherein
the battery body comprises a single battery unit having a rectangular prism shape.

10. The secondary battery of claim 1, wherein
the battery body comprises a plurality of rectangular unit batteries arranged to form a rectangular prism.

11. The secondary battery of claim 10, wherein
at least one side of each of the plurality of unit batteries is curved and the curved sides of the plurality of unit batteries are aligned to be on a same side of the battery body, and
the first and second side cases each comprise a filling member extending from one end of the vertical portions of the first and second side cases to fill gaps between the curved sides of the plurality of unit batteries.

12. The secondary battery of claim 1, further comprising:
a coupling member disposed in a contact portion between the horizontal portions of the first and second side cases to integrally couple the first and second side cases to each other.

13. The secondary battery of claim 12, wherein
the coupling member includes a coupling protrusion formed on the horizontal portions of one of the first and second side cases and a coupling groove formed on the horizontal portions of the other of the first and second side cases.

14. The secondary battery of claim 13, wherein
the outside diameter of the coupling protrusion is equal to or larger than the inside diameter of the coupling groove.

15. The secondary battery of claim 3, wherein
each of the vertical portions of the first and second side cases comprises:
 a rectangular bottom; and
 sides that extend along the lengthwise direction of the rectangular bottom and that extend from opposing sides of the bottom,
wherein the sides of the battery body that face the rectangular bottoms of the vertical portions are inserted between the sides of the vertical portions of the first and second side cases.

16. The secondary battery of claim 1, further comprising:
an adhesive sheet to adhere the first and second side cases to the battery body.

17. A secondary battery, comprising:
a battery body having a mostly rectangular prism shape; and
a side case, comprising:
 a first side case having a first portion disposed to cover a first area of one of the sides of the battery body and a second portion that is connected to one end of the first portion to cover at least a portion of a side of the battery body adjacent to the one of the sides of the battery body,
 a second side case having a first portion, in which a plurality of terminal holes are formed, disposed to cover a second area of the one of the sides of the battery body and a second portion connected to one end of the first portion to cover at least a portion of a side of the battery body opposite the side of the battery body adjacent to the one of the sides of the battery body, and
a protective circuit board disposed between the battery body and the first portions of the first and second side cases and electrically connected to the battery body; and a guide member disposed between the battery body and the protective circuit board to couple slidably the guide member to the first and second side cases.

18. The secondary battery of claim 17, wherein the first and second side cases each comprises sides extending perpendicularly from opposing edges of the first portion toward the battery body.

19. The secondary battery of claim 18, wherein the battery body is slidable into the side case such that the sides of the first and second side cases are disposed to cover portions of opposing sides adjacent to the one side covered by the first portions of the first and second side cases and between the opposing sides of which at least a portion is covered by the second portions of the first and second side cases.

20. The secondary battery of claim 18, wherein the first and second side cases each comprises ribs extending perpendicularly from facing surfaces of the sides toward each other.

21. The secondary battery of claim 17, wherein the protective circuit board is electrically connected to the battery body and disposed in the first and second side cases between the sides of the first and second side cases, the ribs extend from the sides of the first and second sides cases, and the first portions of the first and second side cases.

22. The secondary battery of claim 21, wherein the protective circuit board comprises:
connection terminals disposed to be exposed to the outside through the plurality of terminal holes.

23. The secondary battery of claim 21, wherein the protective circuit board is slidable into the first and second side cases.

24. The secondary battery of claim 17, wherein
each of the first and second side cases comprises a step portion disposed at an other end of the first portion, opposite the one end of the first portion, and
the first and second side cases are coupled to each other at the other ends of the first and second portions.

25. The secondary battery of claim 24, further comprising:
an adhesive sheet disposed in the step portions of the first and second side cases to couple the first and second side cases to each other.

* * * * *